United States Patent [19]
Beggiato

[11] Patent Number: 5,048,169
[45] Date of Patent: Sep. 17, 1991

[54] HOSE-REPAIR TOOL

[76] Inventor: Antonio Beggiato, 810 Charlotte Ter., Ridgefield, N.J. 07657

[21] Appl. No.: 549,770

[22] Filed: Jul. 9, 1990

[51] Int. Cl.[5] .......... B23P 19/04
[52] U.S. Cl. .......... 29/235; 29/237
[58] Field of Search .......... 29/234, 235, 237, 255, 29/280, 282, 263, 259

[56] References Cited

U.S. PATENT DOCUMENTS

| | | | |
|---|---|---|---|
| 1,094,978 | 4/1914 | Church | 29/237 |
| 2,821,775 | 2/1958 | Pavelka | 29/237 |
| 2,986,192 | 5/1961 | Macleod | 29/237 |
| 3,787,950 | 1/1974 | Bagby | 29/237 |
| 4,418,458 | 12/1983 | Hunter | 29/237 |

*Primary Examiner*—Robert C. Watson
*Attorney, Agent, or Firm*—Hopgood, Calimafde, Kalil, Blaustein & Judlowe

[57] ABSTRACT

The invention contemplates a unit-handling tool, suitable for field use, for selective extraction or assembly of an end fitting to an end of flexible hose. The tool features a cylindrical anvil which is sized for running clearance with the bore of the end fitting and with the bore of the hose, for insertion through and beyond the distal end of the fitting. The tool provides clamping elements with means for squeezing a hose securely against the anvil and at a location close to but beyond the inner axial end of an end fitting for the hose. The clamped region is longitudinally connected to screw-jacking structure which is engageable to the exposed longitudinal end of the end fitting; rotation of the jack screw in one direction, as by wrench torque, will drive a new fitting into telescoped assembly to the bore of a hose end, while rotation of the jack screw in the opposite direction will extract an end fitting from a hose. In an assembly operation, the longitudinal connection to the clamped region is in tension, and in an extraction operation, the longitudinal connection to the clamped region is in compression.

16 Claims, 1 Drawing Sheet

HOSE-REPAIR TOOL

BACKGROUND OF THE INVENTION

The invention relates to a hose-repair tool for use in assembly and/or disassembly of a hose-coupling element with respect to an end of flexible hose, such as a hose for conduct of liquid or gaseous fluid.

It often occurs, as in the course of a relatively large-scale construction project, that flexible hose, for the flexible delivery of water, steam, compressed air, or the like, is damaged or broken through careless handling of heavy mobile equipment. Such hoses may have an inside diameter in the order of 2 inches and a wall thickness of ⅜ to ½ inch and are of construction suited to the task, as for example elastomeric materials that are reinforced with multiple braided plies of synthetic filaments and steel wire. The hoses are costly, and the same may be said of coupling elements fitted and tightly clamped to the end of each length of hose. When time is important to completion of a project, it frequently occurs that a complete new hose length with its end-coupling fitments will be placed into service, leaving the broken or damaged hose for discard, to be scrapped. This is, of course, a wasteful practice, and it is also wasteful of crew time if one even tries to salvage the end-coupling elements of a damaged hose; this is so, because with prolonged use and exposure, the rubber or other elastomeric of the hose becomes effectively vulcanized and locked to the end-coupling elements, and sledge-hammer and other abusive techniques may be required to reclaim an end fitting. I am unaware of any existing tool or technique for quick and damage-free recovery of an end fitting from a damaged hose.

BRIEF STATEMENT OF THE INVENTION

It is an object of the invention to provide a tool for quickly and efficiently removing an end fitting of the character indicated from a damaged length of hose.

Another object is to meet the above object with a tool that is equally applicable to the quick and efficient assembly of a new or reclaimed end fitting to the unfitted end of a new or reclaimed length of hose.

A further object is to meet the above objects with a relatively simple tool which is portable and particularly adapted to field use.

The invention achieves the foregoing objects in a unit-handling tool which provides a cylindrical anvil sized for running fit within the bore of a conventional end fitting and associated hose. The tool provides clamping elements with means for squeezing a hose securely against the anvil and at a location close to but beyond the inner axial end of an end fitting for the hose. The clamped region is longitudinally connected to screw-jacking structure which is engageable to the exposed longitudinal end of the end fitting; rotation of the jack screw in one direction, as by wrench torque, will drive a new fitting into telescoped assembly to the bore of a hose end, while rotation of the jack screw in the opposite direction will extract an end fitting from a hose. In an assembly operation, the longitudinal connection to the clamped region is in tension, and in an extraction operation, the longitudinal connection to the clamped region is in compression.

DETAILED DESCRIPTION

The invention will be described in detail for a preferred embodiment, in conjunction with the accompanying drawings, in which.

Figure 1:
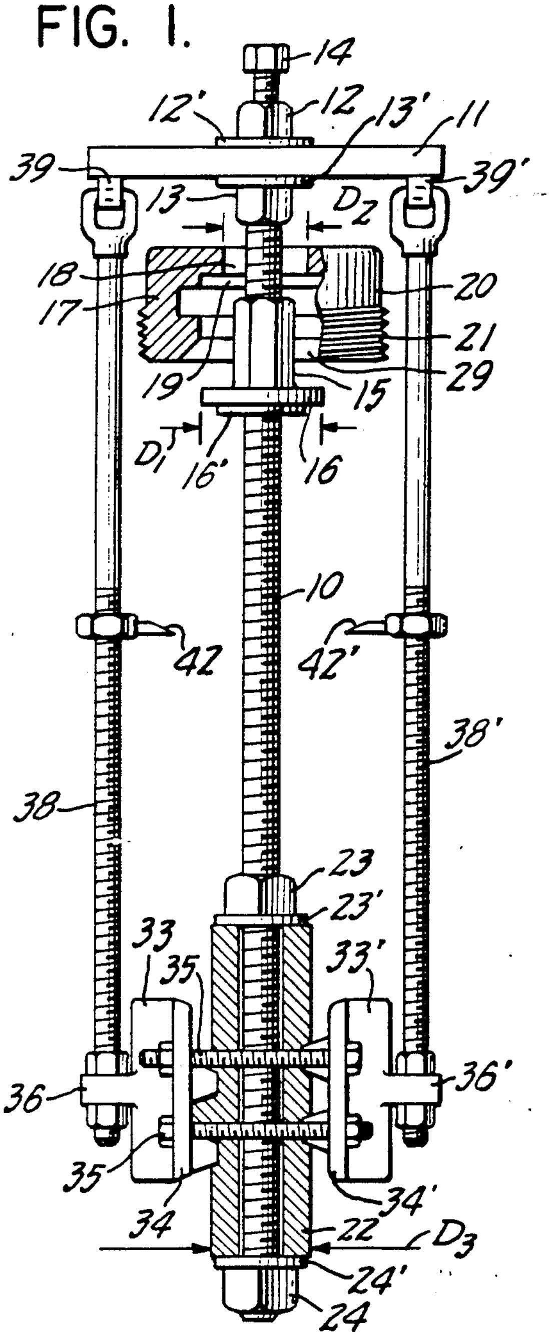
FIG. 1 is a view in side elevation, showing the tool of my invention, with certain elements broken away and in longitudinal section.

Referring initially to FIG. 1, the tool of the invention is seen to comprise an elongate jack screw 10, preferably with Acme threads, and mounted at its upper end for axially retained rotation with respect to a crosspiece 11. Such a mounting can take various forms, but as shown, nuts 12, 13 and interposed washers 12', 13' bear against opposite sides of crosspiece 11, the nuts 12, 13 being welded to screw 10 in their threaded positions such that rotary freedom is available for screw 10. A bolt 14 of smaller size is welded to the upper end of screw 10, whereby the tool is adapted to torquing of the jack-screw, using a common, relatively small crescent or other wrench.

A flanged nut 15 has threaded engagement to the jack-screw 10. Nut 15 is characterized by longitudinally elongate wrench flats and by a lower flange 16, of diameter $D_1$.

An annular plug 17 is loosely assembled between nut 15 and nut 13. Plug 17 has (i) a bore 18 of diameter $D_2$ to safely clear interference with the flats of nut 15 and (ii) a counterbore 19 to receive, seat and locate flange 16 when the tool is used in its extraction mode. When thus seated, the flats of nut 15 extend axially beyond the upper axial end of plug 17, for a wrenching hold against rotation, while the jack screw 10 is driven, as will later be explained. The exterior of plug 17 is characterized by upper wrench flats 20 and by lower threads 21, which are needed only in the extraction mode of the tool.

At the lower end of jack screw 10, a tubular anvil 22 is axially located and free to rotate, i.e., free of screw 10 so as not to rotate therewith. Axial retention is provided by upper and lower nuts 23, 24 threaded to screw 10 and anchored in position, preferably by weldments, although lock-nutted engagements at 23 and at 24 could equally well serve the axial-retention purpose, and preferably with interposed washers 23', 24' to bear against the respective ends of anvil 22, namely, with thrust against the upper end of the anvil in the extraction mode of the tool, and with thrust against the lower end of the anvil in the assembly mode of the tool. The diameter $D_3$ of anvil 22 is selected for close but running clearance with the bore 25 of an end fitting 26 and also for running clearance with the unstressed bore 27 of an end 28 of hose 30 fitted thereto (see FIG. 3); thus, in use of the tool, anvil 22 is freely insertable through an end fitting 26 and into a region of the hose bore (27) that is axially beyond the distal end 31 of the fitting.

Figure 2:
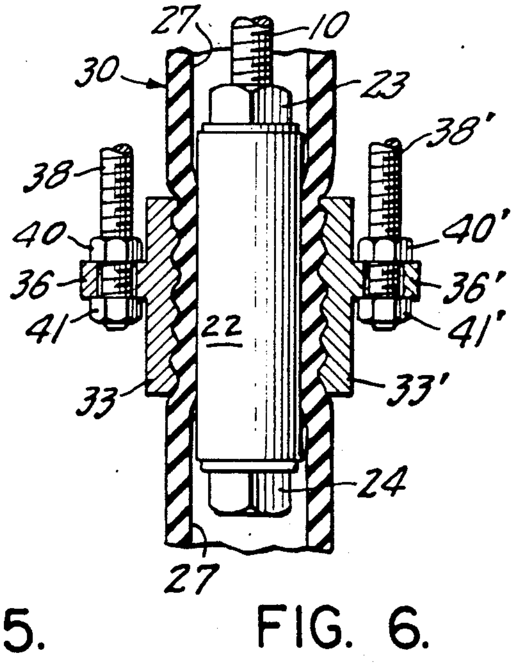
FIG. 2 is a fragmentary view in partial section to provide detail of a hose-clamping engagement at the lower end of the tool of FIG. 1.

In axial register and overlap with anvil 22, provision is made for applying two opposed cylindrically arcuate halves 33, 33′ of clamp structure to locally squeeze hose 30 against the anvil. As shown in FIGS. 1 and 2, each half of the clamp is internally characterized by ribbing which shows as an undulation in FIG. 2, for enhanced local engagement to and indentation of the hose. Each clamp half has integral side-flange formations 34, 34′ whereby pairs of bolts 35 through opposed flanges 34, 34′ may be driven to apply the clamping squeeze. The clamp halves 33, 33′ are each shown with integral side-lug formations 36, 36′ which are bored for angularly loose, axially retained connection to separate rods 38, 38′ having angularly articulated connection to opposed outboard parts 39, 39′ of the crosspiece 11. Rods 38 (38′) are preferably threaded and welded to axial locating nuts 40, 41 (40′, 41′), for retention of the angularly loose connection to lugs 36 (36′); and at adjustably positionable intermediate positions along the threaded portions of rods 38 (38′), flat tapered finger elements 42 (42′) having threaded engagement to the respective rods are radially inwardly directed, for a purpose to be described.

Figure 3:
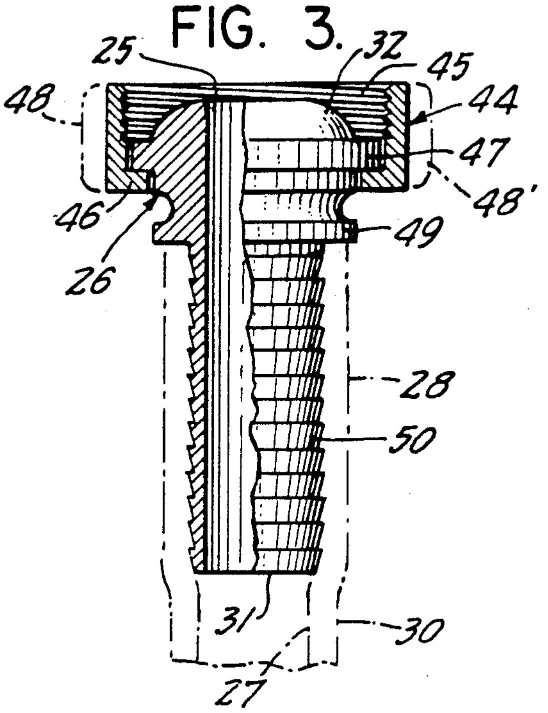
FIG. 3 is a view in side elevation, partly broken away and in section, to show a hose-end fitting, illustratively suited for assembly to or disassembly from a hose end, using the tool of FIG. 1.

It is meaningful to observe that end fittings of relevance to the presently described embodiment of the invention comprise two parts, namely, a tubular part 26, as seen in FIG. 3, and a coupling-ring part 44. The coupling ring 44 has internal threads 45 and a lower-end flange 46, which is radially inward to establish a shoulder beneath a flange formation 47 of the tubular end fitting 26. Phantom outlines 48, 48′ are suggestive of diametrically opposed outward lug formations which are the standard complement of commercial fittings, but these formations serve no purpose in use of the present invention. The tubular part 26 integrally includes another flange 49 which defines a shoulder against which the axial end of an assembled hose end 28 is drawn, prior to clamping; such clamping is by well-known means that is irrelevant to the invention and is therefore not shown. Peripheral ribbing on the exterior of the elongate tail 50 of part 26 is standard, for enhanced axial retention when clamped.

In use as an extraction device, the tool of FIG. 1 must operate upon the fitting parts 26, 44 of FIG. 3 to which a hose end 28 has become tightly connected, even after external clamps (not shown) along the hose end 28 have been removed. First of all, the clamp bolts 35 must be sufficiently loosened or removed, to permit outward articulation of rods 38, 38′ and their associated clamp halves 33, 33′ away from anvil 22. Anvil 22 is then inserted through the bore 25 of fitting 26 and into the unstressed bore of hose 30, i.e., so that the anvil axially clears the bore 25. At this point, bolts 35 and associated nuts are driven to tighten the clamp halves 33, 33′ into tight local radial compression and deformation of hose 30 against anvil 22, as shown in FIG. 2. Having thus set a clamped reference for the tool, nut 15 is run down the jack screw 10 until its flange 16 contacts (or almost contacts) the convex spherically finished upper end of fitting 26. In this relationship, it is a simple matter then to engage the external threads 21 of plug 17 with the internal threads 45 of the ring part 44 of the end fitting. When threads 21/45 are sufficiently engaged, the flange (16) diameter $D_1$ will be concentrically located in the counterbore 19 of plug 17, and the elongate flats of nut 15 will be externally exposed for wrench-holding access above plug 17. In this engaged relationship, it will be noted that a concave spherical seat formation 29 of plug 17 may also engage the convex spherical seat formation 32 of fitting 26. By holding nut 15 against rotation, while driving the jack screw in rotation (via wrenching torque at 14), nut 15 is caused to travel upward, in firm engagement with plug 17, and with accompanying tension development in rods 38, 38′. Continued jacking action, namely, by wrenching drive at 14, and holding nut 15 against rotation, applies progressive elastic stretching force to hose 30, breaking the engagement of the hose to tail piece 50, and eventually removing the fitting 26 and its ring 44 from the hose end 28.

By way of assisting operations in the extraction mode of the tool of the invention, and while the clamp halves 33, 33′ are parted and rods 38, 38′ outwardly swung, the threaded finger elements 42, 42′ should be manipulated on rods 38, 38′ until they engage under the flange 49 of fitting 26, and with sufficient radially inward entry to initiate a wedge action between flange 49 and the adjacent end surface of hose end 28. Clamping at 33, 35 (33′, 35′) can then proceed as already described, followed by plug 17 engagement at 21/45 to ring 44, and subsequent jacking operation of screw 10 on nut 15. The additional result then produced by jacking travel of nut 15 upward along the screw 10 is that fingers 42, 42′ are forced to apply a strong local downward push to the upper end of hose end 28 while the hose is being stretched, due to jacking reference to the clamp of hose 30 to anvil 22. There ultimately comes an instant at which all binding engagement of hose end 28 to tail 50 fails, as signified by a sudden downward separating displacement of the hose end 28 away from flange 49.

Figure 4:
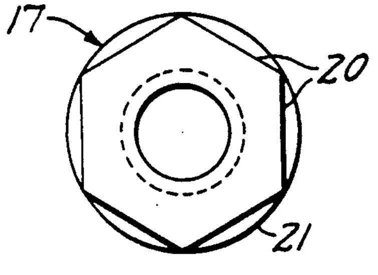
FIG. 4 is a plan view of a component part of the tool of FIG. 1.

In the description thus far, plug 17 has been described as being circumferentially continuous, as the same appears in the plan view of FIG. 4. Plug 17 is not needed in the assembly mode of using the tool of FIG. 1 and therefore it may seem a nuisance to have it loose and unused in an assembly operation. That being the case, the alternative of FIG. 5 or of FIG. 6 may be adopted.

Figure 5:
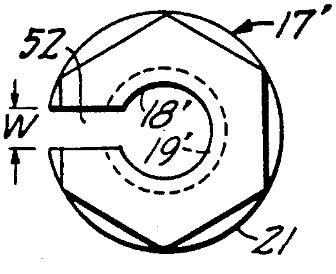
FIGS. 5 and 6 are plan views of component parts which are different alternatives for the part shown in FIG. 4.
Figure 6:
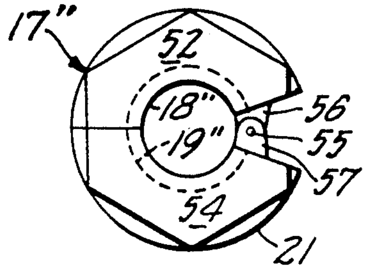

In FIG. 5, the plug 17′ is identical to the plug 17 of FIG. 4, except that a radial slot 52 interrupts its circumferential continuity. Slot 52 is of width W to clear the diameter of jack screw 10, thus permitting selective assembly of plug 17′ to the tool, and ready removal therefrom, as desired. In the plug 17″ alternative of FIG. 6, the same feature of ready assembly to screw 10 (and removability therefrom) is provided by a construction wherein the plug 17″ comprises two arcuate halves 53, 54 of a single plug; these halves have selective hinging action about a pinned connection 55 of their suitably nested lug formations 56, 57. When closed as shown in FIG. 6, the halves 53, 54 effectively complete the plug features as described in connection with FIGS. 1 and 4, and with inherent ability to withstand the circumferential compression which results from jacked tension of the threaded engagement at 21/45. When these threads are disengaged, the halves 53, 54 may be sufficiently hinged open, to permit removal from screw 10.

In use of the invention in the assembly mode, a hose 30 to receive a fitting 26 (with ring 44) is first clamped against anvil 22 in the manner already described, but at a location which clears the end of the hose by at least the length of end fitting 26. The distal end 31 of the tail 50 is then positioned for entry into the exposed open end of the hose, while nut 15 is manipulated into contact with the upper end of fitting 26; at this point, an axially short reduced cylindrical land portion 16′ of the underside of flange 16 sufficiently enters the bore 25 of fitting 26, so as to maintain concentricity of nut (15) to fitting

(26) engagement. Wrenching torque applied at 14 (with wrenching retention of nut 15 against rotation) may then drive nut 15, and therefore also fitting 26, for assembling entry into the hose end, to the point of the completed assembly suggested by phantom outline 28 in FIG. 3. Nut 15 can be backed off, and clamp bolts 35 released, in order to permit tool removal (i.e., anvil 22 removal) from the now-assembled hose with parts 26, 44. Conventional clamping of the assembly may then proceed.

While it has been said above that plug 17 is not necessary for assembly-mode operations, plug 17 may nevertheless provide a useful stabilizing function, in that a threaded take-up of the engagement 21/45 can be made to the point of spherical-seat engagement at 29/32, in which case, the elongate flats of nut 15 will extend above plug 17, fully accessible for retaining-wrench access to nut 15, while applying jacking torque at 14, in the direction to drive nut 15 with downward advance along jack screw 10.

What is claimed is:

1. A hose-repair tool for use in assembly or disassembly of a hose-coupling element with respect to an end of a length of flexible hose, wherein the coupling element comprises an elongate tubular tail having a straight bore of substantially the nominal inside diameter of the hose, said tubular tail having an outwardly flanged coupling formation at one end, said tool comprising an elongate threaded rod and a transverse body member to the central region of which one end of said rod is mounted for rotation and is restrained against axial displacement, a rigid annular anvil member having a bore in running clearance with said rod and having an outer diameter in running clearance with the bore of the coupling element, two like tie rods connected at one end to diametrically opposed points of suspension from said body member and extending like distances substantially parallel to said threaded rod, a hose clamp comprising separate arcuate halves each of which halves is connected to the other end of one of said rods, whereby said anvil and threaded rod may be axially inserted via the bore of the coupling element and into the hose beyond the end of the tail of the coupling element, further whereby the separable halves of said clamp may engage the hose over diametrically opposite arcs backed by said anvil, thus deriving clamped engagement of said body member to the hose at longitudinal offset from said coupling element, and means including a jacking element in threaded engagement to said threaded rod and adapted for axially driving engagement with the flanged formation of the coupling element, whereby depending upon the direction of relative rotation of said threaded rod and jacking element, the coupling element will be subjected to axial-displacement force in the direction of separating or of assembling the coupling element with respect to the hose.

2. The tool of claim 1, in which the body-mounted end of said threaded rod is characterized by externally accessible wrench flats.

3. The tool of claim 1, in which said jacking element includes wrench flats which are externally accessible via space between said tie rods.

4. The tool of claim 1, in which said threaded rod has means at its lower end for retaining said anvil against axial displacement in either direction with respect to said threaded rod.

5. The rod of claim 1, for use in connection with a coupling element which additionally includes an internally threaded coupling ring that is rotatable with respect to and engaged to said flanged coupling formation, said jacking element comprising a flanged nut in threaded engagement with said threaded rod, said nut having elongate wrench flats above an outward flange at its lower end, and an externally threaded plug sized for selective engagement to the internal threads of said coupling ring, said plug having a central opening which clears said wrench flats but interferes with and therefore precludes through-passage of the flange of said nut.

6. The tool of claim 5, wherein said plug has a counterbore at the lower axial end of said central opening, and said counterbore is sized to receive and centrally locate the flange of said nut.

7. The tool of claim 1, in which said jacking element includes a flanged nut in threaded engagement with said threaded rod, the outside diameter of the flange of said nut exceeding the bore diameter of said coupling element.

8. The tool of claim 7, in which the underside of the flange of said nut has a reduced diameter concentric projection sized for centering location in the bore of said coupling element.

9. The tool of claim 1, in which said tie rods have at least some freedom of angular displacement from parallelism with said threaded rod.

10. The tool of claim 9, in which each of said tie rods has at least some freedom of angular displace-ability at connection to its associated clamp half.

11. The tool of claim 1, in which a separate radially inward finger is selectively positionable along each of said tie rods, said fingers being adapted for wedging radially inward penetration between the flange formation of said coupling element and the adjacent axial end of a hose fitted to the tail of said coupling element.

12. The tool of claim 5, for use with a coupling element which has a convex spherical formation at its upper end, and in which the lower end of said plug has a concave spherical formation which has self-aligning engageability with said convex formation.

13. The tool of claim 5, in which said plug is formed with a single radial slot of width to clear the diameter of said threaded rod.

14. The tool of claim 5, in which said plug comprises substantially semicylindrical separable halves which define substantial circumferential continuity when fitted to each other and when said plug is in threaded engagement with said coupling ring.

15. The tool of claim 14, in which said separable halves having a hinging articulating connection at radial offset from the central axis of said plug.

16. A hose-repair tool for use in assembly or disassembly of a hose-coupling element with respect to an end of a length of flexible hose, wherein the coupling element comprises an elongate tubular tail having a straight bore of substantially the nominal inside diameter of the hose, said tubular tail having an outwardly flanged coupling formation at one end, and said tubular tail also having an internally threaded and inwardly flanged coupling ring, said tool comprising an elongate threaded rod and a transverse body member to the central region of which one end of said rod is mounted for rotation and is restrained against axial displacement, a rigid annular anvil member having a bore in running clearance with said rod and having an outer diameter in running clearance with the bore of the coupling element, means engaged to said threaded rod at both axial ends of said anvil for retaining the axial location of said anvil on said rod, two like tie rods connected at one end to diametrically opposed points of suspension from said body member and extending like distances substantially parallel to said threaded rod and with a degree of freedom to depart from strict parallelism to said threaded rod, a hose clamp comprising separate arcuate halves each of which halves is connected to the other end of one of said rods, whereby said anvil and threaded rod may be axially inserted via the bore of the coupling element and into the hose beyond the end of the tail of the coupling element, further whereby the separable halves of said clamp may engage the hose over diametrically opposite arcs backed by said anvil, thus deriving clamped engagement of said body member to the hose at longitudinal offset from said coupling element, means including a jacking element in threaded engagement to said threaded rod and adapted for axially driving engagement with the coupling element, and a centrally open plug having external threads engageable to the internal threads of said coupling ring, said plug being interposed between said transverse body member and said jacking element and being axially driven by said jacking element for at least one direction of threaded-rod rotation, whereby depending upon the direction of relative rotation of said threaded rod and jacking element, the coupling element will be subjected to axial-displacement force in the direction of separating or of assembling the coupling element with respect to the hose.

* * * * *